US009992472B1

(12) United States Patent
Cutu

(10) Patent No.: US 9,992,472 B1
(45) Date of Patent: Jun. 5, 2018

(54) OPTOELECTRONIC DEVICES FOR COLLECTING THREE-DIMENSIONAL DATA

(71) Applicant: Heptagon Micro Optics Pte. Ltd., Singapore (SG)

(72) Inventor: Florin Cutu, San Jose, CA (US)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days. days.

(21) Appl. No.: 15/625,176

(22) Filed: Jun. 16, 2017

Related U.S. Application Data

(60) Provisional application No. 62/487,286, filed on Apr. 19, 2017, provisional application No. 62/470,447, filed on Mar. 13, 2017.

(51) Int. Cl.
*H04N 13/00* (2018.01)
*H04N 13/02* (2006.01)

(52) U.S. Cl.
CPC ..... *H04N 13/0007* (2013.01); *H04N 13/0207* (2013.01); *H04N 13/0246* (2013.01); *H04N 13/0253* (2013.01)

(58) Field of Classification Search
CPC ........... H04N 13/0007; H04N 13/0253; H04N 13/0207; H04N 13/0246
See application file for complete search history.

(56) References Cited

U.S. PATENT DOCUMENTS

| 2014/0027614 | A1* | 1/2014 | Geier | H01L 31/02325 250/208.1 |
|---|---|---|---|---|
| 2016/0291200 | A1 | 10/2016 | Bakin et al. | |
| 2016/0350929 | A1* | 12/2016 | Tubic | G01B 11/25 |
| 2017/0090020 | A1 | 3/2017 | Buettgen | |
| 2017/0115497 | A1* | 4/2017 | Chen | G06K 9/00335 |
| 2017/0135617 | A1 | 5/2017 | Alasirniö et al. | |

FOREIGN PATENT DOCUMENTS

| WO | WO 2016/080908 | 5/2016 |
| WO | WO 2017/014691 | 1/2017 |
| WO | WO 2017/014692 | 1/2017 |
| WO | WO 2017/014693 | 1/2017 |
| WO | WO 2017/030507 | 2/2017 |

* cited by examiner

*Primary Examiner* — Mehrdad Dastouri
*Assistant Examiner* — Joseph Becker
(74) *Attorney, Agent, or Firm* — Fish & Richardson P.C.

(57) ABSTRACT

The disclosure describes optoelectronic devices for collecting three-dimensional data without determining disparity. The approach permits significant flexibility relative to state-of-the-art approaches for collecting three-dimensional data. For example, the illuminations (e.g., patterns) generated by the disclosed devices need not exhibit the same degree of complexity or randomness of illuminations generally required by structured-light approaches. Further, the devices described in the present disclosure exhibit, in some instances, optimal resolution over a wide distance range. An optoelectronic device described herein is operable to generate an illumination comprising a plurality of high-intensity features that exhibit a distance-dependent alteration when imaged by an imager incorporated into the optoelectronic device.

13 Claims, 3 Drawing Sheets

OPTOELECTRONIC DEVICES FOR COLLECTING THREE-DIMENSIONAL DATA

CROSS-REFERENCE TO RELATED APPLICATIONS

This application claims the benefit of priority of U.S. Provisional Patent Application No. 62/470,447, filed on Mar. 13, 2017, and U.S. Provisional Patent Application No. 62/487,286, filed on Apr. 19, 2017. The contents of the earlier applications are incorporated herein by reference in their entirety.

BACKGROUND

Triangulation approaches, such as structured light (or encoded light), sometimes are used to collect three-dimensional data. These approaches present a number of challenges. Generally, for example, triangulation approaches require the determination of disparity, which can be resource intensive. Structured-light approaches require the illumination of a three-dimensional object with an encoded emission (i.e., the structured light). Encoded emissions require a degree of complexity or randomness (e.g., pseudo randomness) that can be difficult to achieve, as it can require expensive or complicated optical elements and other components. Further, triangulation approaches generally require precise alignment of components in order to compute three-dimensional data accurately. Additionally, state-of-the-art approaches for collecting three-dimensional data that require illuminating three-dimensional objects sometimes exhibit optimal resolution only over a narrow distance range.

SUMMARY

The present disclosure describes devices for collecting three-dimensional data without the need to determine disparity. This approach permits significant flexibility relative to state-of-the-art approaches for collecting three-dimensional data. For example, the illuminations (e.g., patterns) generated by the disclosed devices need not exhibit the same degree of complexity or randomness of illuminations generally required by structured-light approaches. In some instances, illuminations generated by the disclosed devices may be regular (e.g., a rectangular grid of dots or lines). In some instances, these illuminations can be generated with simple, inexpensive optical elements. Further, the devices described in the present disclosure can, in some instances, exhibit optimal resolution over a wide distance range.

In one aspect, for example, an optoelectronic device for collecting three-dimensional data includes an emitter. The emitter includes an array of light-emitting elements, and an emitter optical assembly aligned with the array of light-emitting elements. The emitter is characterized by an emitter optical axis. The array of light-emitting elements is operable to emit light onto the emitter optical assembly, and the emitter optical assembly is operable to direct the light over a field-of-illumination. The light directed over the field-of-illumination forms an illumination. The illumination includes high-intensity features that are characterized by a high-intensity feature density.

The optoelectronic device further includes an imager. The imager includes an array of light-sensitive intensity elements, and an imager optical assembly aligned with the array of light sensitive intensity elements. The imager is characterized by an imager optical axis. The imager optical assembly is operable to direct reflected portions of the illumination over a field-of-view onto the array of light-sensitive intensity elements thereby generating an image of the reflected portions of the illumination. The reflected portions of the illumination originate from one or more objects within the field-of-view, the one or more objects are disposed respectively at one or more distances from the optoelectronic device. The one or more distances delineate three-dimensional data. Moreover, the emitter and imager are configured such that the high-intensity feature density is substantially constant in the generated image.

In some implementations, an optoelectronic device includes a processor communicatively coupled to the imager operable to generate an image. The processor is operable to extract three-dimensional data from the image.

In some implementations, an optoelectronic device includes an emitter and imager configured such that a plurality of high-intensity features included in an illumination exhibit a distance-dependent alteration in an image generated by the imager.

In some implementations, an optoelectronic device includes an emitter and an imager configured such that a plurality of high-intensity features included in an illumination exhibit a distance-dependent alteration in an image generated by the imager. The optoelectronic device further includes a processor operable to extract three-dimensional data from the distance-dependent alteration.

In some implementations, an optoelectronic device includes an emitter having an emitter optical axis and an imager having an imager optical axis where the two axes are tilted with respect to each other such that a high-intensity feature density is substantially constant in an image generated by the imager.

In some implementations, an optoelectronic device includes a plurality of high-intensity features characterized by a distance-dependent alteration. The distance-dependent alteration includes a general projective transformation, a part of which is a lateral translation of at least a portion of the high-intensity features. The lateral translation is a function of distance from the optoelectronic device.

In some implementations, an optoelectronic device includes high-intensity features characterized by a distance-dependent alteration. The distance-dependent alteration includes a general projective transformation, a part of which is a lateral translation of at least a portion of the high-intensity features. The lateral translation is a function of distance from the optoelectronic device. Moreover, the distance-dependent alteration further includes at least one additional translation of at least one additional portion of the high-intensity features, where the at least one additional lateral translation is another function of distance from the optoelectronic device.

In some implementations, an optoelectronic device includes a field-of-view characterized by a field-of-view angle, and a field-of-illumination characterized by a field-of-illumination angle. The field-of-view angle is not equal to the field-of-illumination angle.

In some implementations, an optoelectronic device includes an emitter characterized by an emitter optical axis, and imager characterized by an imager optical axis are configured such that the emitter optical axis and the imager optical axis are tilted with respect to each other by between 0.1° and 10°.

In some implementations, an optoelectronic device includes a field-of-illumination angle between 0.1° and 10° larger than a field-of-view angle.

In some implementations, an optoelectronic device includes light directed over a field-of-illumination where each are a quasi-regular grid of high-intensity features.

In another aspect, an optoelectronic device for collecting three-dimensional data includes a first emitter. The first emitter includes a first array of light-emitting elements, and a first emitter optical assembly aligned with the first array of light-emitting elements. The first emitter is characterized by a first emitter optical axis. The first array of light-emitting elements is operable to emit a first light onto the first emitter optical assembly, and the first emitter optical assembly is operable to direct the first light over a first field-of-illumination.

The optoelectronic device further includes a second emitter including a second array of light-emitting elements, and a second emitter optical assembly aligned with the second array of light-emitting elements. The second emitter is characterized by a second emitter optical axis. The second array of light-emitting elements is operable to emit a second light onto the second emitter optical assembly, and the second emitter optical assembly is operable to direct the second light over a second field-of-illumination. The light directed over the first field-of-illumination and second field-of-illumination forms an illumination. The illumination includes high-intensity features characterized by a feature density.

The optoelectronic device further includes an imager. The imager includes an array of light-sensitive intensity elements, and an imager optical assembly aligned with the array of light sensitive intensity elements. The imager is characterized by an imager optical axis. The imager optical assembly is operable to direct reflected portions of the illumination over a field-of-view onto the array of light-sensitive intensity elements thereby generating an image of the reflected portions of the illumination. The reflected portions of the illumination originate from one or more objects within the field-of-view. The one or more objects are respectively disposed at one or more distances from the optoelectronic device. The one or more distances delineating three-dimensional data. The first emitter, the second emitter, and the imager are configured such that the feature density is substantially constant in the generated image.

In some implementations, an optoelectronic device includes a processor communicatively coupled to an imager operable to generate an image. The processor is operable to extract the three-dimensional data from the image.

In some implementations, an optoelectronic device includes a first emitter, a second emitter, and an imager configured such that a plurality of high-intensity features included in an illumination exhibit a distance-dependent alteration in an image generated by the imager.

In some implementations, an optoelectronic device includes a first emitter, a second emitter, and an imager configured such that a plurality of high-intensity features included in an illumination exhibit a distance-dependent alteration in an image generated by the imager. The optoelectronic device further includes a processor operable to extract three-dimensional data from the distance-dependent alteration.

In some implementations, an optoelectronic device includes a first emitter characterized by a first emitter optical axis, a second emitter characterized by a second emitter optical axis, and an imager characterized by an imager optical axis where all axes are all tilted with respect to each other such that a high-intensity feature density is substantially constant in a generated image.

In some implementations, an optoelectronic device is operable to generate an illumination. The illumination includes f high-intensity features that exhibit a distance-dependent alteration. The distance-dependent alteration includes a distortion of at least a portion of the high-intensity features. The distortion is a function of the distance from the optoelectronic device. In some instances, the distance-dependent alteration of the high-intensity features includes at least one additional distortion of at least one additional portion of the high-intensity features. The at least one additional distortion is another function of distance from the optoelectronic device.

In some implementations, an optoelectronic device includes a first emitter, a second emitter, and an imager each characterized by a first emitter optical axis, a second emitter optical axis, and an imager optical axis, respectively. The first emitter, second emitter, and imager are configured such that the first emitter optical axis, the second emitter optical axis, and the imager optical axis are tilted with respect to each other by between 0.1° and 10°.

In some implementations, an optoelectronic device includes a first emitter, second emitter, and an imager each characterized by a first field-of-illumination, second field-of-illumination, and field-of-view. The first field-of-illumination is characterized by a first field-of-illumination angle, the second field-of-illumination is characterized by a second field-of-illumination angle, and the field-of-view is characterized by a field-of-view angle. The first field-of-illumination angle is not equal to the second field-of-illumination angle, and the field-of-view angle is not equal to the first field-of-illumination angle or the second field-of-illumination angle.

In some instances, the first field-of-illumination angle and/or the second field-of-illumination angle is between 0.1° and 10° larger than the field-of-view angle, and neither the first field-of-illumination angle nor the second field-of-illumination angle is larger than the other by between 0.1° and 10°.

In some implementations, an optoelectronic device is operable to generate first light directed over a first field-of-illumination and second light directed over a second field-of-illumination each of which has a quasi-regular grid of high-intensity features.

In some implementations, an optoelectronic device is operable to generate an illumination that includes a Moiré pattern.

In some implementations, an optoelectronic device includes a non-transitory computer-readable medium comprising instructions stored thereon, that when executed on a processor, perform operations including:
  illuminating one or more calibration objects with a first and second emitters
  collecting a set of calibration images at different distances, each calibration image is associated with a distance value
  identifying a set of training images from the set of calibration images, the set of training images are distinguishable from each other and delineate a depth-ordered sequence of training images.

In some implementations, an optoelectronic device includes a non-transitory computer-readable medium comprising instructions stored thereon, that when executed on a processor, perform operations including:
  collecting a test image of an object or objects
  extracting from the test image a first test patch having a first set of coordinates extracting from one or more training images, one or more respective training patches having the same first set of coordinates as the first test patch comparing the first test patch to the one or more training patches extracted from the one or more respective training images identifying a training patch that matches the first test patch from among the one or more training patches correlating the first test patch with a first distance value associated with the matching training patch, the matching training patch is associated with a corresponding training image within the depth-ordered sequence of training images storing the first distance value.

In some implementations, an optoelectronic device includes a non-transitory computer-readable medium comprising instructions stored thereon, that when executed on a processor, perform operations including:

extracting from the test image one or more additional test patches, each having a set of coordinates within the test image for each of the one or more additional test patches, extracting from one or more training images, one or more respective training patches having the same set of coordinates as the additional test patch for each of the one or more additional test patches, comparing the additional test patch to the one or more training patches extracted from the one or more respective training images for each of the one or more additional test patches, identifying a training patch that matches the additional test patch from among the one or more training patches for each of the one or more additional test patches, correlating the additional test patch with a distance value associated with the matching training patch, the matching training patch is associated with a corresponding training image within the depth-ordered sequence of training images storing the one or more distance values associated with the one or more additional test patches.

In some implementations, an optoelectronic device includes a non-transitory computer-readable medium comprising instructions stored thereon, that when executed on a processor, perform an operation of constructing a three-dimensional rendering of one or more objects from a first distance value and one or more additional distance values.

In some implementations, an optoelectronic device includes a non-transitory computer-readable medium comprising instructions stored thereon, that when executed on a processor, performs the operation of determining a refined first distance value by interpolating distance values associated with training images neighboring the training image having a matching training patch with the same first set of coordinates.

In some implementations, an optoelectronic device includes a non-transitory computer-readable medium comprising instructions stored thereon, that when executed on a processor, performs the operation of determining a refined distance value for each of a one or more additional distance values by interpolating distance values associated with training images neighboring the training image having a matching training patch with the same set of coordinates as an additional test patch. In some instances, interpolating distance values includes quadratic interpolation.

In some implementations, an optoelectronic device includes a non-transitory computer-readable medium comprising instructions stored thereon, that when executed on a processor, perform the operation of summarizing a depth-ordered sequence of training images with a plurality of eigenimages.

In some implementations, each training image is a linear combination of eigenimages. The eigenimages are orthogonal to each other thereby forming an eigenspace coordinate system in which the training images are expressed, and the weights of the linear combination are eigenspace coordinates of the training images in eigenspace.

In some implementations, an optoelectronic device includes a non-transitory computer-readable medium comprising instructions stored thereon, that when executed on a processor, perform operations including:

extracting from one or more training images, respective training patches each having a set of training coordinates, the set of training coordinates is the same for each of the one or more training patches summarizing the training patches with a plurality of corresponding patch-eigenimages.

In some implementations, each training patch is a linear combination of patch eigenimages, the patch eigenimages are orthogonal to each other thereby forming a patch eigenspace coordinate system in which the training patches are expressed, and the weights of the linear combination are patch eigenspace coordinates of the training patches in patch eigenspace.

In some implementations, an optoelectronic device includes a non-transitory computer-readable medium comprising instructions stored thereon, that when executed on a processor, perform operations including:

collecting a test image of one or more objects extracting a first test patch from the test image, the first test patch having a first set of coordinates projecting the first test patch onto the patch eigenspace constructed from the training patches with a set of training coordinates that are the same as the first set of coordinates, and deriving patch eigenspace coordinates of the test patch from this projection comparing the set of patch-eigenspace coordinates of the first test patch with the set of patch-eigenspace coordinates associated with each training patch identifying the matching set of patch-eigenspace coordinates associated with each training patch to the set of patch-eigenspace coordinates of the first test patch correlating the matching set of patch-eigenspace coordinates with a distance value associated with a training image within the depth-ordered sequence of training images.

In some implementations, an optoelectronic device includes a non-transitory computer-readable medium comprising instructions stored thereon, that when executed on a processor, perform the operation of binarizing a plurality of training images. In some instances, binarizing a plurality of training images includes adaptive thresholding methods.

In some implementations, an optoelectronic device includes a non-transitory computer-readable medium comprising instructions stored thereon, that when executed on a processor, perform the operation of determining a set of cluster centers by applying a clustering technique to a set of training patches. Each cluster center within the set of cluster centers represents one or more training patches within the set of training patches. In some instances, a clustering technique includes hierarchical k-means clustering.

In some implementations, an optoelectronic device includes a non-transitory computer-readable medium comprising instructions stored thereon, that when executed on a processor, perform operations including:

collecting a test image of one or more objects extracting a first test patch from the test image, the first test patch having a first coordinate set substantially equal to the training patch coordinate set comparing the first test patch to the set of cluster centers identifying a matching cluster center within the set of cluster centers comparing the first test patch to the training patches within the matching cluster center correlating the first test patch with a distance value associated with the matching training patch, the matching training patch is associated with a training image within the set of training images.

In some implementations, an optoelectronic device includes a non-transitory computer-readable medium comprising instructions stored thereon, that when executed on a processor, perform the operation of constructing a three-dimensional rendering of an object or objects from a distance value.

Although the foregoing devices and techniques can be particularly advantageous for collecting three-dimensional data without determining disparity, in some instances they can be used in conjunction with determining disparity. Thus, the devices and techniques described here for collecting three-dimensional data also can be used in applications in which disparity is determined.

Other aspects, features and advantages will be apparent from the following detailed description, the accompanying drawings, and the claims.

DETAILED DESCRIPTION

Figure 1:
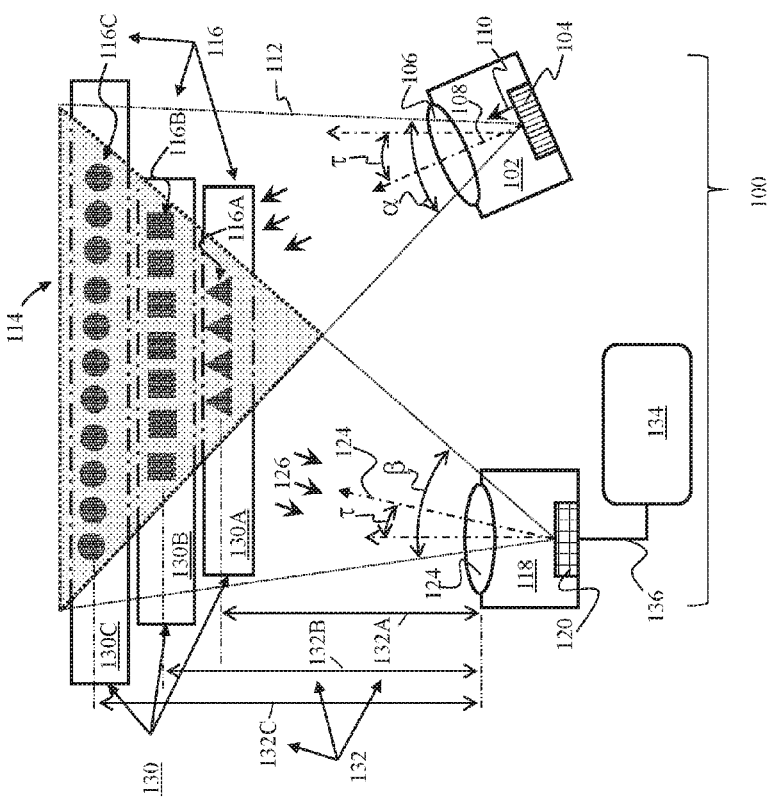
FIG. 1 depicts an example optoelectronic device operable to collect three-dimensional data. The device is characterized by a single emitter.

FIG. 1 depicts an example of an optoelectronic device 100 operable to collect three-dimensional data without implementing disparity calculations and further exhibiting optimal resolution over a wide range of distances. The optoelectronic device 100 includes an emitter 102. The emitter 102 includes an array of light-emitting elements 104 and an emitter optical assembly 106 aligned with the array of light-emitting elements 104. The emitter 102 is characterized by an emitter optical axis 108, and a field-of-illumination 112 characterized by a field-of-illumination angle α.

The array of light-emitting elements 104 can include, for example, a plurality of light-emitting diodes, vertical-cavity surface-emitting lasers, other laser diodes, or any combination thereof. The array of light-emitting elements 104 is operable to emit light 110 onto the emitter optical assembly 106. Light 110 can be characterized by a broad range of wavelengths (e.g., 700 nm to 1000 nm) or can be characterized by a narrow range of wavelengths centered around a single wavelength (e.g., 650 nm). Light 110 can be visible light (e.g., red or white light), invisible light (e.g., infrared or ultraviolet), or otherwise non-visible light (e.g., visible light suitably pulsed for a human observer).

The emitter optical assembly 106 can include a cover glass, a refractive lens, a diffractive lens, a microlens array, a diffuser, a spectral filter, an aperture, or a plurality of refractive lenses, diffractive lenses, microlens arrays, diffusers, spectral filters, or any combination thereof. The emitter optical assembly 106 is operable to direct the light 110 over the field-of-illumination 112. Light 110 directed over the field-of-illumination 112 forms an illumination 114.

The illumination 114 includes a plurality of high-intensity features 116, such as a quasi-regular pattern of dots, circles, ellipses, or a regular pattern of dots, circles, ellipses, gridlines and so forth. The plurality of high-intensity features 116 is characterized by a high-intensity feature density; that is, the number of high-intensity features per an area.

The optoelectronic device 100 further includes an imager 118. The imager 118 includes an array of light-sensitive intensity elements 120, and an imager optical assembly 122 aligned with the array of light sensitive intensity elements 120. The imager 118 is characterized by an imager optical axis 124, and a field-of-view 128 characterized by a field-of-view angle θ. The array of light-sensitive intensity elements 120 can include, for example, photodiodes, charge-coupled devices (CCDs), complementary metal-oxide semiconductor (CMOS) devices, arrays of the foregoing devices, or any combination thereof.

The imager optical assembly 124 can include a cover glass, a refractive lens, a diffractive lens, a microlens array, a diffuser, a spectral filter, an aperture, or a plurality of refractive lenses, diffractive lenses, microlens arrays, diffusers, spectral filters, or any combination thereof. The imager optical assembly 124 is operable to direct reflected portions 126 of the illumination 114 over a field-of-view 128 onto the array of light-sensitive intensity elements 120 thereby generating an image of the reflected portions 126 of the illumination 114.

The reflected portions 126 of the illumination 114 originate from one or more objects 130 within the field-of-view 128. The one or more objects 130 can be any object, such as a person, a motor vehicle, or a substantially flat surface such as a wall, operable to reflect at least a portion of the illumination 114. The one or more objects 130 are disposed respectively at one or more distances 132 from the optoelectronic device 100. Several objects 130A-130C are depicted in FIG. 1 at different respective distances 132A-132C from the optoelectronic device 100. For example, object 130A, may be disposed at one meter from the device 100, while another object 130C may be disposed at 10 meters from the device 100. The one or more distances 132 delineate three-dimensional data, such as the positions of the one or more objects in space (e.g., described by a Cartesian coordinate system) relative to the optoelectronic device 100.

The optoelectronic device 100 is operable to generate a substantially constant high-intensity feature density in the image generated by the imager 118 (e.g., the density variation across the image is less than 5%). The substantially constant high-intensity feature density permits a substantially constant resolution over a wide range of distances. In some instances, the degree to which the high-intensity feature density is constant dictates the range over which the resolution is constant. In some instances, a degree of inconsistency in the high-intensity feature density is acceptable as the approach for collecting three-dimensional data described in this disclosure can be robust with respect to such inconsistencies since disparity computations are not required for the collection of three-dimensional data. Such inconsistencies may arise, for example, when the field-of-view angle α and the field-of-view β are not exactly equal. Consequently, in some instances, the field-of-view angle β is not equal to the field-of-illumination angle α. For example, the field-of-illumination angle α can be between 0.1° and 10° larger than a field-of-view angle β.

The emitter 102 and the imager 118 are operable such that the high-intensity feature density is substantially constant in the generated image. In some instances, the emitter 102 and imager 118 are further configured such that the plurality of high-intensity features 116 exhibit a distance-dependent alteration in the image generated by the imager 118. The distance-dependent alteration is illustrated as simple geometric shapes 116A-116C in FIG. 1. The plurality of high-intensity features 116 alters from triangles 116A incident on the object 130A at the distance of 132A, to squares 116B incident on the object 130B at the distance 132B, to circles 116C incident on the object 130C at the distance 132C. While, the distance-dependent alteration is illustrated as simple geometric shapes 116A-116C, any high-intensity feature or arrangement of high-intensity features, as described above, is within the scope of the present disclosure. For example, the high-intensity features 116 can include a Moiré pattern. In some instances, the distance-dependent alteration includes a general projective transformation, a part of which is a lateral translation of at least a portion of the plurality of high-intensity features 116. The lateral translation can be a function of distance from the optoelectronic device 100. In some instances, the distance-dependent alteration further includes at least one additional translation of at least one additional portion of the high-intensity features 116, where the at least one additional lateral translation can be another (e.g., different) function of distance from the optoelectronic device 100.

In some instances, the emitter optical axis 108 and the imager optical axis 124 are tilted with respect to each other (schematically represented as τ in FIG. 1) such that the high-intensity feature density is substantially constant in the image generated by the imager 118. For example, the emitter optical axis 108 and the imager optical axis 124 are tilted with respect to each other by between 0.1° and 10°. Although τ is represented in FIG. 1 as the degree of tilt between either optical axis 108, 124 and an arbitrary axis (dash-dotted arrow) orthogonal to the emitter 102, imager 118, it should be understood that tilt τ is the degree of tilt between the imager optical axis 124 and the emitter optical axis 108. Generally, the emitter optical axis 108 and the imager optical axis 124 are tilted with respect to each other such that: 1) the high-intensity feature density is substantially constant in the image generated by the imager 118, and 2) the plurality of high-intensity features 116 exhibit a distance-dependent alteration in the image generated by the imager 118 as described above.

The optoelectronic device 100 further includes a processor 134 communicatively coupled 136 to the imager 118 in some instances. The processor 134 is operable to extract three-dimensional data from the distance-dependent alteration captured in the image, as described in greater detail below.

Figure 2:
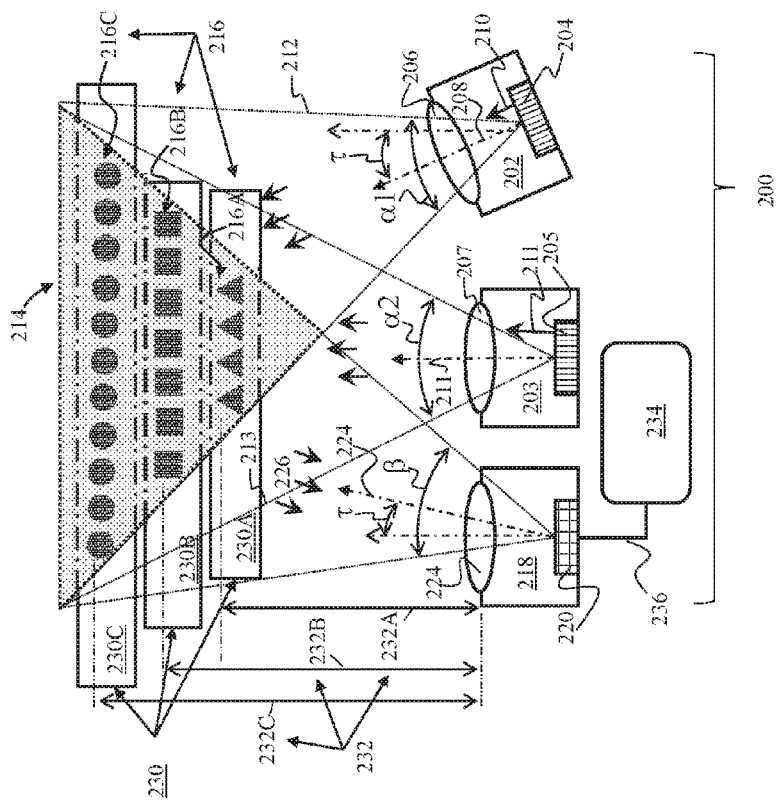
FIG. 2 depicts another example optoelectronic device operable to collect three-dimensional data. The device is characterized by a plurality of emitters.

FIG. 2 depicts another example optoelectronic device 200 operable to collect three-dimensional data without implementing disparity calculations and further exhibiting optimal resolution over a wide range of distances. The optoelectronic device 200 includes a first emitter 202. The first emitter 202 includes a first array of light-emitting elements 204, and a first emitter optical assembly 206 aligned with the first array of light-emitting elements 204. The first emitter 202 is characterized by a first emitter optical axis 208, and a first field-of-illumination 212 characterized by a second field-of-illumination angle α1.

The first array of light-emitting elements 204 can include, for example, a plurality of light-emitting diodes, vertical-cavity surface-emitting lasers, other laser diodes, or any combination thereof. The first array of light-emitting elements 204 is operable to emit first light 210 onto the first emitter optical assembly 206. First light 210 can be characterized by a broad range of wavelengths (e.g., 700 nm to 1000 nm) or can be characterized by a narrow range of wavelengths centered around a single wavelength (e.g., 650 nm). First light 210 can be visible light (e.g., red or white light), invisible light (e.g., infrared or ultraviolet), or otherwise non-visible light (e.g., visible light suitably pulsed for a human observer).

The first emitter optical assembly 206 can include a cover glass, a refractive lens, a diffractive lens, a microlens array, a diffuser, a spectral filter, an aperture, or a plurality of refractive lenses, diffractive lenses, microlens arrays, diffusers, spectral filters, or any combination thereof. The first emitter optical assembly 206 is operable to direct first light 210 over a first field-of-illumination 212. The first emitter 202 can be configured such that first light 210 includes a plurality of first initial high-intensity features (e.g., a pattern of dots or grid lines) over the first field-of-illumination 212.

The optoelectronic device 200 further includes a second emitter 203. The second emitter 203 includes a second array of light-emitting elements 205, and a second emitter optical assembly 207 aligned with the second array of light-emitting elements 204. The second emitter 203 is characterized by a second emitter optical axis 209, and a second field-of-illumination 213 characterized by a second field-of-illumination angle α2.

The second array of light-emitting elements 205 can include, for example, a plurality of light-emitting diodes, vertical-cavity surface-emitting lasers, other laser diodes, or any combination thereof. The second array of light-emitting elements 205 is operable to emit second light 211 onto the second emitter optical assembly 207. Second light 211 can be characterized by a broad range of wavelengths (e.g., 700 nm to 1000 nm) or can be characterized by a narrow range of wavelengths centered around a single wavelength (e.g., 650 nm). Second light 211 can be visible light (e.g., red or white light), invisible light (e.g., infrared or ultraviolet), or otherwise non-visible light (e.g., visible light suitably pulsed for a human observer).

The second emitter optical assembly 207 can include a cover glass, a refractive lens, a diffractive lens, a microlens array, a diffuser, a spectral filter, an aperture, or a plurality of refractive lenses, diffractive lenses, microlens arrays, diffusers, spectral filters, or any combination thereof. The second emitter optical assembly 207 is operable to direct second light 211 over a second field-of-illumination 213. The second emitter 203 can be configured such that second light 211 includes a plurality of second initial high-intensity features (e.g., a pattern of dots or grid lines) over the second field-of-illumination 213. The superposition of the first light 210 and second light 211 (i.e., over the first field-of-illumination 212 and second field-of-illumination 213) forms (e.g., via interference) an illumination 215. The illumination 215 can be a Moiré interference pattern, for example, as discussed in further detail below.

In some instances, the first emitter 202 is configured such that the first emitter optical assembly 206, together with the array of first light-emitting components 204, converts (e.g., via the Lau effect) first light 210 into a plurality of first initial high-intensity features (e.g., a pattern of dots or grid lines) over the first field-of-illumination 212. Likewise, the second emitter 203 can be configured such that the second emitter optical assembly 207, together with the array of second light-emitting components 205, converts (e.g., via the Lau effect) second light 211 into a plurality of second initial high-intensity features (e.g., a pattern of dots or grid lines) over the second field-of-illumination 213. Further details of examples of the first emitter 202 and second emitter 203 are disclosed in U.S. Pat. No. 9,273,846, which is incorporated herein by reference in its entirety.

In some instances, the first emitter 202 and second emitter 203 can be combined into a single channel with a common array of light-emitting components (e.g., a common array of vertical-cavity surface-emitting laser diodes) and a common emitter optical assembly (e.g., a common microlens array). The common array of light-emitting components and/or the common emitter optical assembly may, however, may be configured such that the first emitter 202 and the second emitter 203 are operable as discrete components with all the components as described above. For example, half of the common array of light-emitting components may be characterized by a first pitch, while the other half may be characterized by a second, different pitch.

Alternatively, or in addition to the aforementioned, the single channel may contain other elements, such as additional optical elements (e.g., diffractive or refractive optical elements, prisms), non-transparent walls, and so on configured such that the first emitter 202 and the second emitter 203 are operable as discrete components. For example, the common optical assembly may include an array of prisms associated with half of the common array of light-emitting components resulting in the first emitter 202 and second emitter 203 as disclosed, with all the component described above. That is, the first emitter 202 would include the first array of light-emitting elements 204, the first emitter optical assembly 206, and the first emitter optical axis 208, first light 210, first field-of-illumination 212, and first field-of-illumination angle α1 all as described above. Likewise, the second emitter 203 would include the second array of light-emitting elements 205, the second emitter optical assembly 207, and the second emitter optical axis 209, second light 211, second field-of-illumination 213, and second field-of-illumination angle α2 all as described above. The two emitters 202, 203, however, would occupy the same channel. Further details of examples of first emitter 202 and second emitter 203 combined into a single channel are disclosed in U.S. Pat. No. 9,273,846 and in PCT/SG2016/050033, which are incorporated herein by reference in their entirety.

The illumination 215 includes a plurality of high-intensity features 216, such as a quasi-regular pattern of dots, circles, ellipses, or a regular pattern of dots, circles, ellipses, gridlines and so forth. The plurality of high-intensity features 216 are characterized by a feature density; that is the number of high-intensity features per area. In some instances, the optoelectronic device 200 is operable to generate an illumination 216 that includes a Moiré pattern.

The optoelectronic device 200 further includes an imager 218. The imager 218 includes an array of light-sensitive intensity elements 220, and an imager optical assembly 222 aligned with the array of light sensitive intensity elements 220. The imager 218 is characterized by an imager optical axis 224, and a field-of-view 228 characterized by a field-of-view axis β. The array of light-sensitive intensity elements 220 can include, for example, photodiodes, charge-coupled devices, complementary metal-oxide semiconductor devices, arrays of the, or any combination thereof.

The imager optical assembly 222 can include a cover glass, a refractive lens, a diffractive lens, a microlens array, a diffuser, a spectral filter, an aperture, or a plurality of refractive lenses, diffractive lenses, microlens arrays, diffusers, spectral filters, or any combination thereof. The imager optical assembly 222 can be operable to direct reflected portions 226 of the illumination 214 over a field-of-view 228 onto the array of light-sensitive intensity elements 220 thereby generating an image of the reflected portions 226 of the illumination 214.

The reflected portions 226 of the illumination 214 originate from one or more objects 230 within the field-of-view 228. The one or more objects 230 can be any object, such as a person, a motor vehicle, or a substantially flat surface such as a wall, operable to reflect at least a portion of the illumination 214. The one or more objects 230 are disposed respectively at one or more distances 232 from the optoelectronic device 200. Several objects 230A-230C are depicted in FIG. 2 at different respective distances 232A-232C from the optoelectronic device 200. For example, object 230A, may be disposed at one meter from the device 200, while another object 230C may be disposed at 10 meters from the device 200. The one or more distances 232 delineate three-dimensional data, such as the positions of the one or more objects in space (e.g., described by a Cartesian coordinate system) relative to the optoelectronic device 200.

The optoelectronic device 200 is operable to generate a substantially constant high-intensity feature density in the image generated by the imager 218. The substantially constant high-intensity feature density permits a substantially constant resolution over a wide range of distances. In some instances, the degree to which the high-intensity feature density is constant dictates the range over which the resolution is constant. In some instances, a degree of inconsistency in the high-intensity feature density is acceptable as the approach for collecting three-dimensional data described in this disclosure, further below, can be robust with respect to such inconsistencies since disparity computations are not required for the collection of three-dimensional data. Such inconsistencies may arise, for example, when the field-of-view angle β, the first field-of-illumination angle α1, and/or the second field-of-illumination angle α2 are not exactly equal. Consequently, in some instances, the field-of-view angle β is not equal to the first field-of-illumination angle α1 and/or the second field-of-illumination angle α2. For example, the first field-of-illumination angle α1 or the second field-of-illumination angle α2 can be between 0.1° and 10° larger than a field-of-view angle β. In some instances, neither the first field-of-illumination al angle nor the second field-of-illumination angle α2 is larger than the other by between 0.1° and 10°.

The first emitter 202, the second emitter 203, and the imager 218 are operable such that the high-intensity feature density is substantially constant in the generated image. In some instances, the first emitter 202, the second emitter 203, and the imager 218 are further configured such that the plurality of high-intensity features 216 exhibit a distance-dependent alteration in the image generated by the imager 218. The distance-dependent alteration is illustrated as simple geometric shapes 216A-216C in FIG. 2. The plurality of high-intensity features 216 alters from triangles 216A incident on the object 230A at the distance of 232A, to squares 216B incident on the object 230B at the distance 232B, to circles 216C incident on the object 230C at the distance 232C. While, the distance-dependent alteration is illustrated as simple geometric shapes 216A-216C, any high-intensity feature or arrangement of high-intensity features, as described above, is within the scope of the present disclosure. For example, the plurality of high-intensity features 216 can include a Moiré pattern. In some instances, the distance-dependent alteration includes a general projective transformation, a part of which is a lateral translation of at least a portion of the plurality of high-intensity features 216. The lateral translation can be a function of distance from the optoelectronic device 200. In some instances, the distance-dependent alteration further includes at least one additional translation of at least one additional portion of the high-intensity features 216, where the at least one additional lateral translation can be another (e.g., different) function of distance from the optoelectronic device 200.

In some instances, the first emitter optical axis 208, the second emitter optical axis 209, and the imager optical axis 224 are tilted with respect to each other (schematically represented as $\tau$ in FIG. 2) such that the high-intensity feature density is substantially constant in the image generated by the imager 218. For example, the first emitter optical axis 208, the second emitter optical axis 209, and the imager optical axis 224 are tilted with respect to each other by between 0.1° and 10°. In some instances, the first emitter optical axis 208 and the second emitter optical axis 209 are parallel to each other, but are tilted with respect to the imager optical axis 224. Still other variations are within the scope of this disclosure. Although $\tau$ is represented in FIG. 2 as the degree of tilt between either optical axes 208, 224 and an arbitrary axis (dash-dotted arrow) orthogonal to the first emitter 202, imager 218, it should be understood that tilt $\tau$ is the degree of tilt between the imager optical axis 224 and the first emitter optical axis 108, and, though not represented in FIG. 2, second emitter optical axis 211. Generally, the first emitter optical axis 208, the second emitter optical axis 209, and the imager optical axis 224 are tilted with respect to each other such that: 1) the high-intensity feature density is substantially constant in the image generated by the imager 218, and 2) the plurality of high-intensity features 216 exhibit a distance-dependent alteration in the image generated by the imager 218 as described above.

The optoelectronic device 200 further includes a processor 234 communicatively coupled 236 to the imager 218 in some instances. The processor 234 is operable to extract three-dimensional data from the distance-dependent alteration captured in the image, as described in greater detail below.

Figure 3:
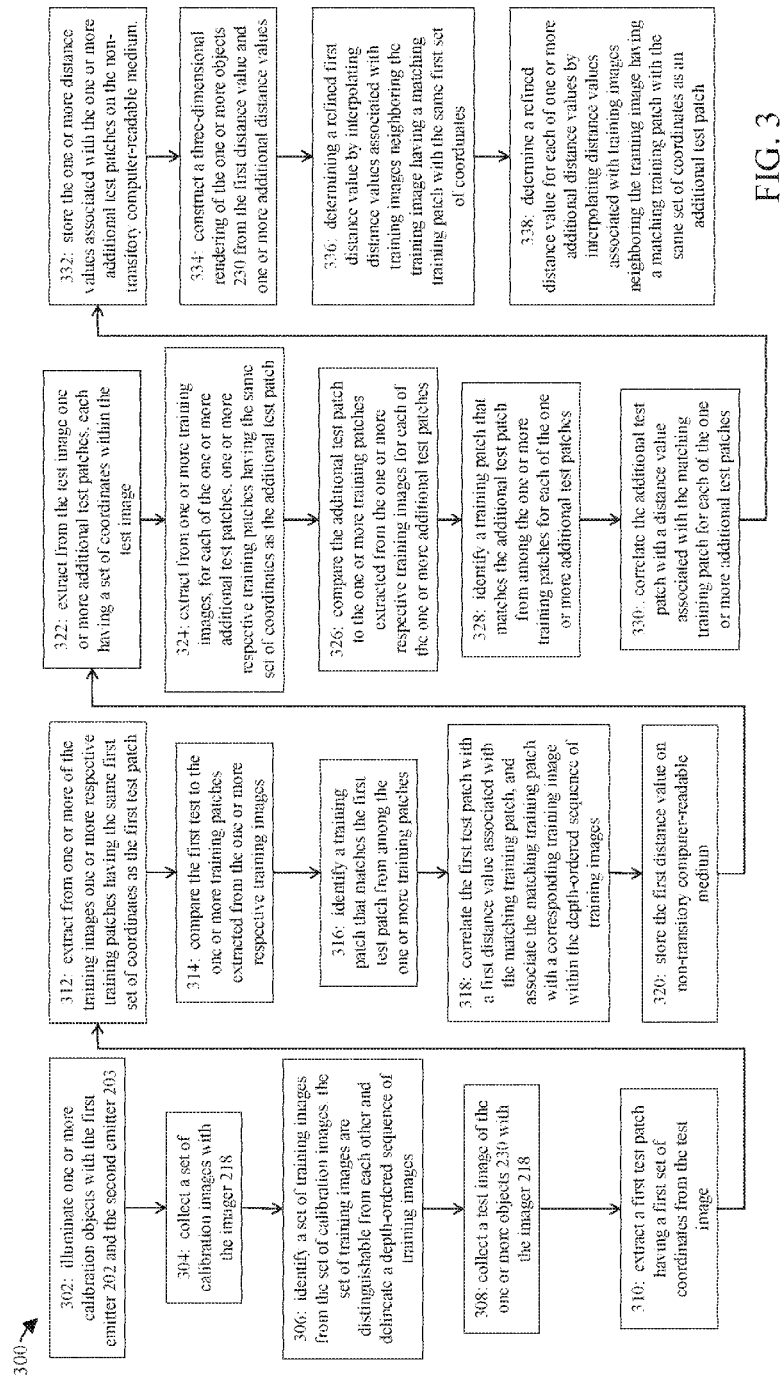
FIG. 3 illustrates an example of steps coded into a non-transitory medium and executed on a processor incorporated into the example optoelectronic device depicted in FIG. 2.

FIG. 3 illustrates an example of operations 300 coded into a non-transitory medium and executed on a processor incorporated into an optoelectronic device. The operations 300 are applicable for any optoelectronic device described by the present disclosure, such as the optoelectronic device 100 (including the attendant processor 134) depicted in FIG. 1, and the optoelectronic device 200 (including the attendant processor 234) depicted in FIG. 2. For clarity, the operations 300 are described below with reference to components corresponding to the optoelectronic device 200 depicted in FIG. 2.

The operations 300 coded into the non-transitory medium and executed on the processor 234 include illuminating one or more calibration objects with the first emitter 202 and the second emitter 203(302). The one or more calibration objects are, for example, standardized targets configured for calibrating optoelectronic devices. The one or more calibration objects are illuminated by the illumination 214.

The one or more calibration objects are positioned at different distances. A calibration image is captured by the imager 218 for each distance. Since the plurality of high-intensity features exhibit a distance-dependent alteration, the calibration images, which capture images of the high-intensity features, will be different for each distance. In some instances, for example, a first calibration image associated with a first distance will capture some of the high-intensity features at a first position, while a second calibration image associated with a second distance will capture the same high-intensity features at a second position translated, for example, from the first position. Consequently, in operation 304, a set of calibration images, formed from reflected portions 226 of the illumination 214, are collected by the imager 218 at the different distances, wherein each calibration image is associated with a distance value relative to the optoelectronic module 200.

In some instances, a large number of calibration images are collected by the imager 218 over a large number of corresponding distances. The differences between these calibration images may be relatively small and may be relatively indistinguishable. For example, the calibration image collected at a distance of 20 cm may be relatively indistinguishable from the calibration image collected at a distance of 22 cm. Consequently, the number of calibration images may be pared down to a set of useful images in order to improve computational speed (e.g., for real-time or near-real-time applications). Accordingly, in another operation 306, a set of training images are identified from the set of calibration images, the set of training images are distinguishable from each other and delineate a depth-ordered sequence of training images.

The operations 300 further can include collecting a test image of the one or more objects 230 (308). The test image is collected by the imager 218. Similar to the calibration images, the test image is an image of the high-intensity features incident on the one or more object 230 for at any given distance. Consequently, the high-intensity features in the test image can be compare to the high-intensity features in the calibration images in order to derive three-dimensional data as further detailed in the subsequent steps.

At 310, a first test patch having a first set of coordinates is extracted from the test image.

At 312, one or more respective training patches having the same first set of coordinates as the first test patch are extracted from one or more training images.

At 314, the first test patch is compared to the one or more training patches extracted from the one or more respective training images.

At 316, a training patch that matches the first test patch is identified from among the one or more training patches.

At 318, the first test patch is correlated with a first distance value associated with the matching training patch, and the matching training patch is associated with a corresponding training image within the depth-ordered sequence of training images.

At 320, the first distance value is stored, for instance, on the non-transitory computer-readable medium.

The operations 300 further can include extracting from the test image one or more additional test patches, each having a set of coordinates within the test image (322).

At 324, for each of the one or more additional test patches, one or more respective training patches having the same set of coordinates as the additional test patch are extracted from one or more training images.

At 326, for each of the one or more additional test patches, the additional test patch is compared to the one or more training patches extracted from the one or more respective training images.

At 328, for each of the one or more additional test patches, a training patch that matches the additional test patch from among the one or more training patches is identified.

At 330, for each of the one or more additional test patches, the additional test patch is correlated with a distance value associated with the matching training patch, the matching training patch is associated with a corresponding training image within the depth-ordered sequence of training images.

At 332, the one or more distance values associated with the one or more additional test patches is stored, for example, on the non-transitory computer-readable medium.

The operations 300 further can include constructing a three-dimensional rendering of the one or more objects 230 from a first distance value and one or more additional distance values (334).

The operations 300 further can include determining a refined first distance value by interpolating distance values associated with training images neighboring the training image having a matching training patch with the same first set of coordinates (336). In some instances, interpolating distance values includes quadratic interpolation.

The operations 300 further can include determining a refined distance value for each of a one or more additional distance values by interpolating distance values associated with training images neighboring the training image having a matching training patch with the same set of coordinates as an additional test patch (338). In some instances, interpolating distance values includes quadratic interpolation.

The operations 300 further can include summarizing a depth-ordered sequence of training images with a plurality of eigenimages (340).

In some instances, each training image is a linear combination of eigenimages. The eigenimages are orthogonal to each other thereby forming an eigenspace coordinate system in which the training images are expressed, and the weights of the linear combination are eigenspace coordinates of the training images in eigenspace.

Figure 4:
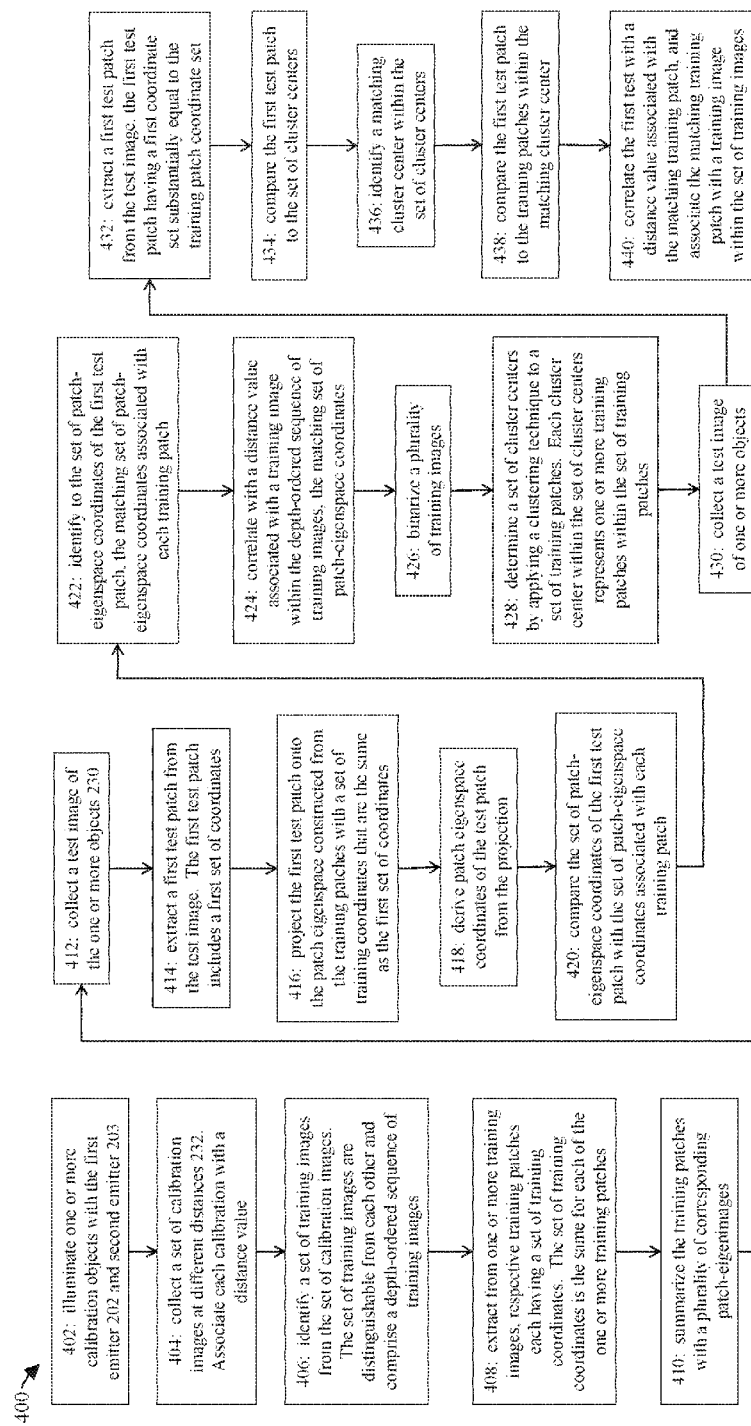
FIG. 4 illustrates another example of steps coded into a non-transitory medium and executed on a processor incorporated into the example optoelectronic device depicted in FIG. 2.

FIG. 4 illustrates additional operations 400 coded into a non-transitory medium and executed on a processor incorporated into an optoelectronic device. The additional operations 400 are applicable to any optoelectronic device described by the present disclosure, such as the example optoelectronic device 100 (and attendant processor 134) depicted in FIG. 1, and the example optoelectronic device 200 (and attendant processor 234) depicted in FIG. 2. For clarity, this example is described below with reference to components corresponding to the optoelectronic device 200 depicted in FIG. 2.

The additional collection of example steps 400 coded into the non-transitory medium and executed on the processor 234 include the step 402 of illuminating one or more calibration objects with the first and second emitters 202, 203 respectively. In another step, 404 a set of calibration images is collected at different distances. Each calibration image is associated with a distance value. In another step 406, a set of training images is identified from the set of calibration images. The set of training images are distinguishable from each other and comprise a depth-ordered sequence of training images.

The additional operations 400 further can include extracting from one or more training images, respective training patches each having a set of training coordinates (408). The set of training coordinates is the same for each of the one or more training patches. At 410, the training patches are summarized with a plurality of corresponding patch-eigenimages.

In some implementations of the additional operations 400, each training patch is a linear combination of patch eigenimages, the patch eigenimages are orthogonal to each other thereby forming a patch eigenspace coordinate system in which the training patches are expressed, and the weights of the linear combination are patch eigenspace coordinates of the training patches in patch eigenspace.

The additional operations 400 further include collecting a test image of the one or more objects 230 in some instances. (412)

At 414, a first test patch is extracted from the test image. The first test patch includes a first set of coordinates.

At 416, the first test patch is projected onto the patch eigenspace constructed from the training patches with a set of training coordinates that are the same as the first set of coordinates.

At 418, patch eigenspace coordinates of the test patch are derived from the projection.

At 420, the set of patch-eigenspace coordinates of the first test patch are compared with the set of patch-eigenspace coordinates associated with each training patch.

At 422, the matching set of patch-eigenspace coordinates associated with each training patch is identified to the set of patch-eigenspace coordinates of the first test patch.

At 424, the matching set of patch-eigenspace coordinates is correlated with a distance value associated with a training image within the depth-ordered sequence of training images.

In some implementations, the additional operations 400 include binarizing a plurality of training images (426). In some instances, the step of binarizing a plurality of training images includes adaptive thresholding methods.

In some implementations, the additional operations include determining a set of cluster centers by applying a clustering technique to a set of training patches (428). Each cluster center within the set of cluster centers represents one or more training patches within the set of training patches. In some instances, the clustering technique includes hierarchical k-means clustering. In some instances, the clustering technique includes principal component analyses.

The additional operations further include, in some instances, collecting a test image of one or more objects (430).

At 432, a first test patch is extracted from the test image, the first test patch having a first coordinate set substantially equal to the training patch coordinate set.

At 434, the first test patch is compared to the set of cluster centers.

At 436, a matching cluster center is identified within the set of cluster centers.

At 438, the first test patch is compared to the training patches within the matching cluster center.

At 440, the first test patch is correlated with a distance value associated with the matching training patch, and the matching training patch is associated with a training image within the set of training images.

In some implementations, the additional operations 400 include constructing a three-dimensional rendering of an object or objects from a distance value. The three-dimensional rendering can be displayed, for example, on the screen of a laptop or smartphone, or other display device.

Various modifications can be made within the spirit of this disclosure. Likewise, in some instances, features described above in connection with different implementations can be combined in the same implementation. Accordingly, other implementations are within the scope of the claims.

What is claimed is:

1. An optoelectronic device for collecting three-dimensional data comprising:
   a first emitter including a first array of light-emitting elements, and a first emitter optical assembly aligned with the first array of light-emitting elements, the first emitter being characterized by a first emitter optical axis;
   the first array of light-emitting elements being operable to emit a first light onto the first emitter optical assembly, and the first emitter optical assembly being operable to direct the first light over a first field-of-illumination;
   a second emitter including a second array of light-emitting elements, and a second emitter optical assembly aligned with the second array of light-emitting elements, the second emitter being characterized by a second emitter optical axis;
      the second array of light-emitting elements being operable to emit a second light onto the second emitter optical assembly, and the second emitter optical assembly being operable to direct the second light over a second field-of-illumination;
   the light directed over the first field-of-illumination and second field-of-illumination comprising an illumination, the illumination including a plurality of high-intensity features, wherein the high-intensity features are characterized by a feature density;
   an imager including an array of light-sensitive intensity elements, and an imager optical assembly aligned with the array of light sensitive intensity elements, the imager being characterized by an imager optical axis;
      the imager optical assembly being operable to direct reflected portions of the illumination over a field-of-view onto the array of light-sensitive intensity elements thereby generating an image of the reflected portions of the illumination;
   wherein the reflected portions of the illumination originate from one or more objects within the field-of-view, the one or more objects being respectively disposed at a plurality of different distances from the optoelectronic device, the plurality of different distances delineating three-dimensional data; and
   the first emitter, the second emitter, and the imager are configured such that the feature density is substantially constant in the generated image and such that the high-intensity features exhibit a distance-dependent alteration in the generated image, and
   the high-intensity features of the illumination include different geometric shapes that differ from one another depending on distance from the optoelectronic device.

2. The optoelectronic device of claim 1, further comprising a processor communicatively coupled to the imager, the processor being operable to extract the three-dimensional data from the image.

3. The optoelectronic device of claim 2, wherein the first emitter, second emitter, and imager are configured such that the high-intensity features exhibit a distance-dependent alteration in the generated image, and the processor is operable to extract three-dimensional data from the distance-dependent alteration.

4. The optoelectronic device of claim 1, wherein the first emitter optical axis, the second emitter optical axis, and the imager optical axis are all tilted with respect to each other such that the high-intensity feature density is substantially constant in the generated image.

5. The optoelectronic device of claim 1, wherein the distance-dependent alteration of the plurality of high-intensity features includes a distortion of at least a portion of the high-intensity features, and the distortion being a function of the distance from the optoelectronic device.

6. The optoelectronic device of claim 5, wherein the distance-dependent alteration of the plurality of high-intensity features includes at least one additional distortion of at least one additional portion of the high-intensity features, and the at least one additional distortion being another function of distance from the optoelectronic device.

7. The optoelectronic device of claim 4, wherein the first emitter, second emitter, and the imager are configured such that the first emitter optical axis, the second emitter optical axis, and the imager optical axis are tilted with respect to each other by between 0.1° and 10°.

8. The optoelectronic device of claim 1, wherein the field-of-view is characterized by a field-of-view angle, the first field-of-illumination is characterized by a first field-of-illumination angle, the second field-of-illumination is characterized by a second field-of-illumination angle, the first field-of-illumination is not equal to the second field-of-illumination, and the field-of-view angle is not equal to the first field-of-illumination angle or the second field-of-illumination angle.

9. The optoelectronic device of claim 8, wherein the first field-of-illumination angle and/or the second field-of-illumination angle is between 0.1° and 10° larger than the field-of-view angle, and neither the first field-of-illumination angle nor the second field-of-illumination angle is larger than the other by between 0.1° and 10°.

10. The optoelectronic device of claim 1, wherein the first light directed over the first field-of-illumination and the second light directed over the second field-of-illumination are each a quasi-regular grid of high-intensity features.

11. The optoelectronic device of claim 1, wherein the illumination comprises a Moiré pattern.

12. The optoelectronic device of claim 1 wherein variation of the feature density across the generated image is less than 5%.

13. The optoelectronic device of claim 1 wherein the different geometric shapes include triangles, squares and/or circles.

* * * * *